United States Patent [19]

Gall

[11] Patent Number: 4,585,367
[45] Date of Patent: Apr. 29, 1986

[54] RELEASABLE LOCKING DEVICE

[75] Inventor: John C. Gall, Chicago, Ill.

[73] Assignee: Sears, Roebuck and Co., Chicago, Ill.

[21] Appl. No.: 698,450

[22] Filed: Feb. 5, 1985

[51] Int. Cl.$^4$ .................... F16B 7/10; F16B 2/02
[52] U.S. Cl. .................... 403/104; 403/110; 403/351; 403/367; 403/372; 272/123
[58] Field of Search .............. 403/104, 350, 367, 374, 403/351, 352, DIG. 7, 109, 110, 365, 366, 372, 309, 314, 313, 290; 272/123, 122

[56] References Cited

U.S. PATENT DOCUMENTS

| | | | |
|---|---|---|---|
| 104,884 | 6/1870 | Keinshagen | 403/341 |
| 1,064,663 | 6/1913 | Maynard | 403/351 |
| 2,432,059 | 12/1947 | Zipser | 287/58 |
| 2,475,927 | 7/1949 | Verderber | 273/80 |
| 2,512,985 | 6/1950 | Tveten | 280/11.37 |
| 2,517,700 | 8/1950 | Odin | 287/58 |
| 2,526,415 | 10/1950 | Refsdal | 287/58 |
| 2,546,157 | 3/1951 | Hume | 287/58 |
| 2,614,770 | 10/1952 | Gabrielson | 242/96 |
| 2,871,044 | 1/1959 | Peterson et al. | 287/58 |
| 2,991,096 | 7/1961 | Davidson | 287/58 |
| 2,992,026 | 7/1961 | Farber | 287/58 |
| 3,095,825 | 7/1963 | Sandberg et al. | 103/153 |
| 3,355,194 | 11/1967 | Rasmussen | 285/302 |
| 3,419,229 | 12/1968 | Werkmeister et al. | 403/350 |
| 3,419,293 | 12/1968 | Conrad | 287/58 |
| 3,515,418 | 6/1970 | Nielsen | 287/58 |
| 3,596,946 | 8/1971 | Burton | 287/58 |
| 3,679,244 | 7/1972 | Reddy | 287/20 R |
| 3,741,514 | 6/1973 | Snurr | 248/412 |
| 3,773,371 | 11/1973 | Carlsson | 292/262 |
| 3,953,138 | 4/1976 | Hine et al. | 403/75 |
| 3,963,360 | 6/1976 | Fedrigo | 403/14 |
| 4,037,839 | 7/1977 | Nelson | 273/84 |
| 4,076,437 | 2/1978 | Mazzolla | 403/350 |
| 4,154,545 | 5/1979 | Pinto et al. | 403/104 |
| 4,164,288 | 8/1979 | Okazaki | 211/207 |
| 4,169,687 | 10/1979 | Schull | 403/109 |
| 4,238,164 | 12/1980 | Mazzolla | 403/109 |
| 4,239,169 | 12/1980 | DeSantis | 248/412 |
| 4,294,560 | 10/1981 | Larkin | 403/104 |
| 4,329,076 | 5/1982 | Coreth | 403/109 |
| 4,376,397 | 3/1983 | Newby | 81/177 A |
| 4,419,026 | 12/1983 | Leto | 403/104 |
| 4,424,987 | 1/1984 | Ryder | 280/823 |
| 4,464,078 | 8/1984 | Vorobyov | 403/351 |

FOREIGN PATENT DOCUMENTS

| | | | |
|---|---|---|---|
| 847371 | 12/1938 | France | 403/351 |
| 2063352 | 6/1981 | United Kingdom | 403/109 |

*Primary Examiner*—Cornelius J. Husar
*Assistant Examiner*—Peter M. Cuomo
*Attorney, Agent, or Firm*—Wood, Dalton, Phillips, Mason & Rowe

[57] ABSTRACT

A releasable locking device for frictionally engaging a bar member. The device includes a cam sleeve adapted to be adjustably positioned in selected locations along the bar member. The cam sleeve has an internal surface generally conforming in shape to the external surface of the bar member entirely along its length and the internal surface of the cam sleeve normally is dimensioned the same as or larger than the bar member so as to be slidably movable along the bar member for adjustably positioning the cam sleeve in a selected location. The cam sleeve is formed of a resilient material for selective radially uniform compressed frictional engagement with the external surface of the bar member. The device also includes a pair of cam collars adapted to be operably disposed in substantially coaxial relation on the cam sleeve. The cam collars each have a continuous internal cam surface adapted to cooperate with a mating external cam surface on the cam sleeve to reduce the dimension of the internal surface of the cam sleeve for selective radially uniform compressed frictional engagement with the bar member in response to opposing axially stationary rotation of the cam collars relative to the cam sleeve in locking directions. The cam collars cooperate with the cam sleeve to define a pair of individual locking members. With this arrangement, the device can be moved along a bar member to a selected location for double locking without the need to twist the bar member to produce the locking condition.

13 Claims, 5 Drawing Figures

RELEASABLE LOCKING DEVICE

BACKGROUND OF THE INVENTION

The present invention generally relates to releasable locking devices and, more particularly, to a releasable locking device for frictionally engaging a bar member or the like.

Among the many types of releasable locking devices are internal twist locks for telescoping members employing an eccentric collar. Such internal twist locks are old in the art and, more recently, improvements in locking ability have been made by replacing the eccentric collar with cam surfaces such as those typically shown in Nielsen, Jr. U.S. Pat. No. 3,515,418 and Davidson U.S. Pat. No. 2,991,096. With the internal twist locking devices of this type, the telescoping members themselves are utilized as the acting and reacting members as locking and unlocking occurs.

Among variations of internal twist locking devices are those typically shown in Hume U.S. Pat. No. 2,546,157 and Peterson et al. U.S. Pat. No. 2,871,044. These devices utilize an external rotatable collar associated with one of a pair of telescoping members where the collar cooperates with the other telescoping member as the acting and reacting members. In typical fashion, the collar can be rotated in one direction to lock the telescoping members in one position and can be rotated in the other direction to unlock the telescoping members for movement to another position.

Still another form of releasable locking device has been proposed in Pinto et al. U.S. Pat. No. 4,154,545. This device utilizes two external collars as the acting and reacting means, but it also employs taper actuated collet type locking means engaged by axial movement of the collars caused by the spreading action of two face cams on the collars. Clearly, the device disclosed in Pinto et al. U.S. Pat. No. 4,154,545 has a number of disadvantages.

In particular, the Pinto et al. device provides no means for releasing the taper actuated collet once the collars are in a locked position. Specifically, a low taper will provide high collet gripping power but will be self-locking, i.e., the low taper will render it difficult to move the collars from a locked to an unlocked position. On the other hand, if the tapers are large enough to be self-releasing, the gripping power of the collet will be much lower.

Accordingly, it has remained to provide an entirely satisfactory releasable locking device where a telescoping member need not be twisted to produce the locking condition. It has also remained to provide a releasable locking device which can be moved along a bar member and locked in any position and wherein double locking occurs to thereby provide a safety provision not found in locking collars now on the market. Further, it has remained to provide an entirely satisfactory releasable locking device capable of economical manufacture and assembly for a multitude of applications.

SUMMARY OF THE INVENTION

In general, the disadvantages of the prior art have been overcome by providing a releasable locking device for frictionally engaging a bar member. The device includes a cam sleeve adapted to be adjustably positioned in selectable locations along the bar member. The cam sleeve has an internal surface generally conforming in shape to the external surface of the bar member entirely along its length and the internal surface of the cam sleeve normally is dimensioned the same as or larger than the bar member so as to be slidably movable along the bar member for adjustably positioning the cam sleeve in a selected location. The cam sleeve is formed of a resilient material for selective radially uniform compressed frictional engagement with the external surface of the bar member. The device also includes a pair of cam collars adapted to be operably disposed in substantially coaxial relation on the cam sleeve. The cam collars each have a continuous internal cam surface adapted to cooperate with a mating external cam surface on the cam sleeve to reduce the dimension of the internal surface of the cam sleeve for selective radially uniform compressed frictional engagement with the bar member in response to opposing axially stationary rotation of the cam collars relative to the cam sleeve in locking directions. The cam collars cooperate with the cam sleeve to define a pair of individual locking members. With this arrangement, the device can be moved along a bar member to a selected location for double locking without the need to twist the bar member to produce the locking condition.

More particularly, the cam sleeve is preferably formed with the external cam surfaces oppositely directed. It will also be appreciated that the cam collars can be advantageously substantially identical in construction for economical manufacture and assembly. However, the cam collars are disposed on the cam sleeve with the internal cam surfaces oppositely directed.

In a preferred embodiment, the cam sleeve includes a first portion of increasing radius in one circumferential direction defining one of the external cam surfaces and a second portion of increasing radius in the other circumferential direction defining the other of the external cam surfaces. The cam collars are then arranged on the cam sleeve with the internal cam surfaces thereof having increasing radii in the same circumferential directions as the corresponding ones of the external cam surfaces so that the locking directions for rotational movement of the cam collars are the circumferential directions of increasing radii of the internal and external cam surfaces. With this arrangement, the cam collars permit expansion of the dimension of the internal surface of the cam sleeve to release the cam sleeve from selective radially uniform compressed frictional engagement with the bar member in response to opposing axially stationary rotation of the cam collars in the opposite or releasing directions.

Still more particularly, an axially extending slot is preferably provided in circumferentially offset or spaced relation in each of the first and second portions of the cam sleeve. The axially extending slots each are disposed between positions of maximum and minimum radii of the external cam surfaces. Additionally, the axially extending slots preferably extend from opposing ends of the cam sleeve to an intermediate point between the first and second portions thereof.

In the preferred embodiment, the axially extending slots are circumferentially offset or spaced at the intermediate point to define a bridge portion joining the first and second portions of the cam sleeve. It will be appreciated, of course, that the cam sleeve is circumferentially slit between the first and second portions thereof substantially completely thereabout with the exception of the bridge portion, and a retaining flange is advantageously provided on each of the opposing ends of the cam sleeve to retain the cam collars in axially stationary positions on the cam sleeve with the axially extending slots extending through the retaining flanges to allow a reduction in diameter to permit assembly of the cam collars on the cam sleeve. In addition, the cam sleeve is preferably of a length substantially the same as the combined length of the cam collars such that the retaining flanges maintain the cam collars in abutting relation on the cam sleeve.

These and other objects, advantages and features of the present invention will become apparent from the following description when considered in connection with the accompanying drawings.

DETAILED DESCRIPTION OF THE PREFERRED EMBODIMENTS

Figure 1:
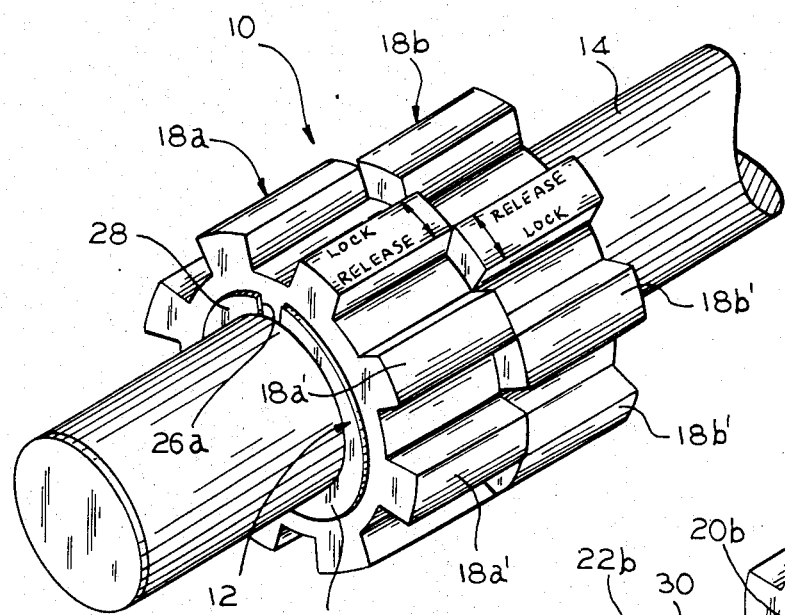
FIG. 1 is a perspective view of a releasable locking device in accordance with the present invention.

In the illustration given and with reference first to FIG. 1, the reference numeral 10 designates generally a releasable locking device in accordance with the present invention. The device 10 includes a cam sleeve 12 adapted to be adjustably positioned in selected locations along a bar member 14 (see, also, FIG. 2). The cam sleeve 12 has an internal surface 16 generally conforming in shape to the external surface of the bar member 14 entirely along its length and the internal surface 16 of the cam sleeve 12 is normally dimensioned the same as or larger than the bar member 14 so as to be slidably movable along the bar member 14 for adjustably positioning the cam sleeve 12 in a selected location. The cam-sleeve 12 is formed of a resilient material for selective radially uniform compressed frictional engagement with the external surface of the bar member 14. The device 10 also includes a pair of cam collars 18a and 18b adapted to be operably disposed in substantially coaxial relation on the cam sleeve 12 (see both FIGS. 1 and 2). The cam collars 18a and 18b each have a continuous internal cam surface 20a and 20b, respectively, adapted to cooperate with a mating external cam surface 22a and 22b, respectively, on the cam sleeve 12 to reduce the dimension of the internal surface 16 of the cam sleeve 12 for selective radially uniform compressed frictional engagement with the bar member 14 in response to opposing axially stationary rotation of the cam collars 18a and 18b relative to the cam sleeve 12 in locking directions. The cam collars 18a and 18b cooperate with the cam sleeve 12 to define a pair of individual locking members. With this arrangement, the device 10 can be moved along the bar member 14 to a selected location for double locking without the need to twist the bar member 14 to produce the locking condition.

Figure 2:
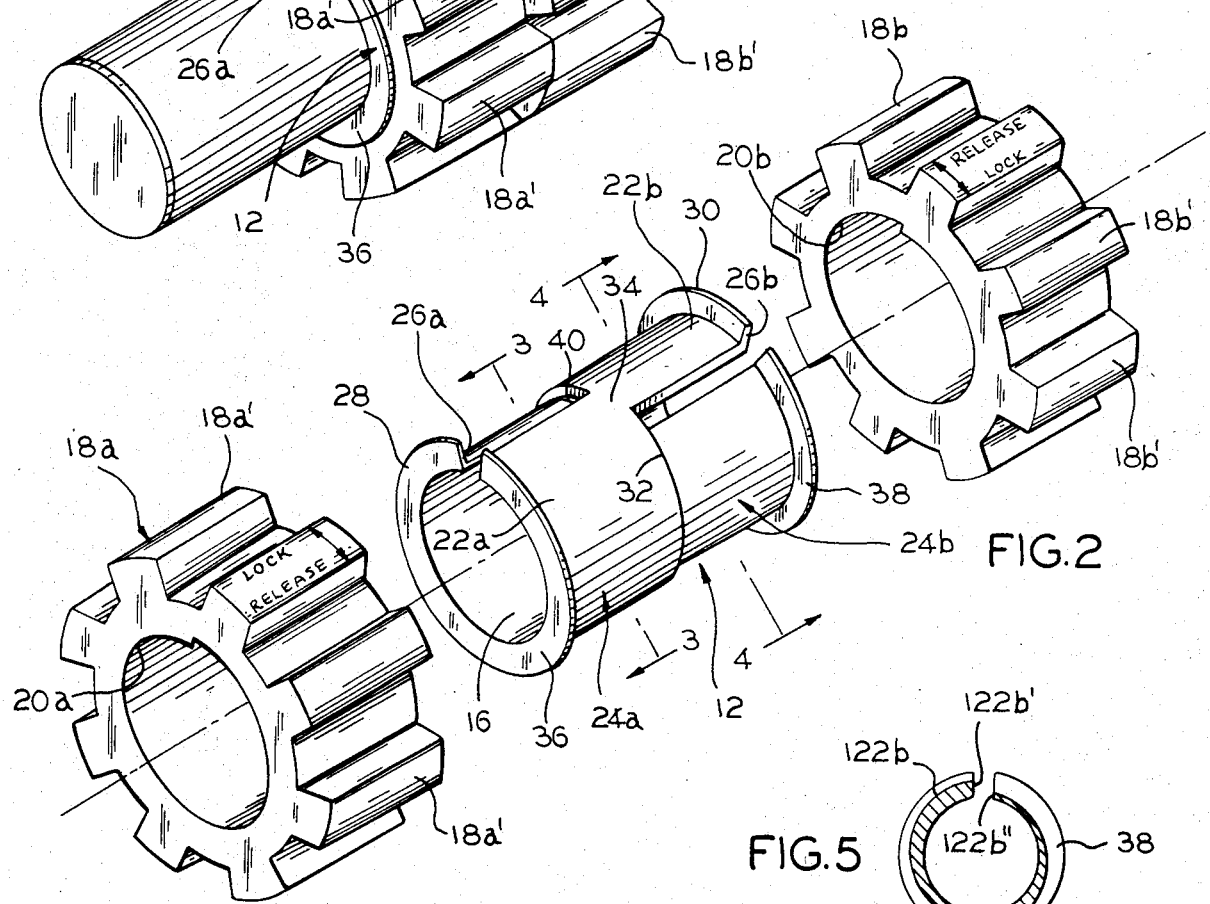
FIG. 2 is an exploded perspective view of the releasable locking device FIG. 1.

Referring specifically to FIG. 2, the cam sleeve 12 is formed with the external cam surfaces 22a and 22b oppositely directed. It will also be seen and appreciated that the cam collars 18a and 18b can be substantially identical in construction for economical manufacture and assembly, although they could have different outer directions, e.g., where the cam collar abutting the weights on a barbell is larger than the other cam collar. However, in any event, the cam collars 18a and 18b are disposed on the cam sleeve 12 with the internal cam surfaces 20a and 20b oppositely directed, as shown.

Figure 3:
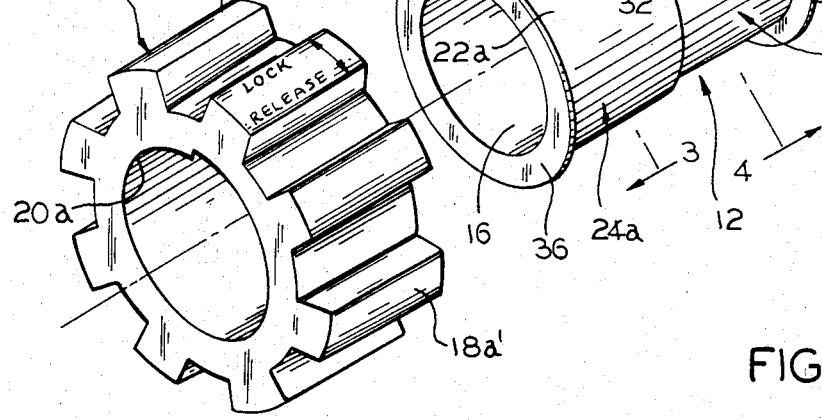
FIG. 3 is a cross sectional view taken along the line 3—3 in FIG. 2.
Figure 4:
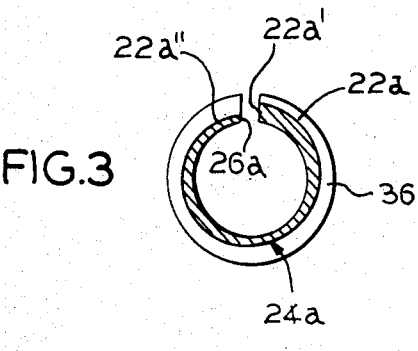
FIG. 4 cross sectional view taken along the line 4—4 in FIG. 2.

Referring to FIGS. 2 through 4, the cam sleeve 12 includes a first portion 24a of increasing radius in one circumferential direction, i.e., a counterclockwise direction, defining one of the external cam surfaces 22a and a second portion 24b of increasing radius in the other circumferential direction, i.e., a clockwise direction, defining the other of the external cam surfaces 22b. The cam collars 18a and 18b are arranged on the cam sleeve 12 with the internal cam surfaces 20a and 20b, respectively, having increased radii in the same circumferential directions as the corresponding ones of the external cam surfaces 22a and 22b, respectively. With this arrangement, the locking directions are the circumferential directions of increasing radii of the internal and external cam surfaces 20a, 22a and 20b, 22b, respectively, i.e., a counterclockwise direction for the cam collar 18a as indicated thereon and a clockwise direction for the cam collar 18b as indicated thereon.

As will be appreciated, the cam collars 18a and 18b permit expansion of the dimension of the internal surface 16 of the cam sleeve 12 to release the cam sleeve 12 from selective radially uniform compressed frictional engagement with the bar member 14 in response to opposing axially stationary rotation of the cam collars 18a and 18b in releasing directions. The releasing directions are directly opposite the locking directions previously described and directly opposite the circumferential directions of increasing radii of the internal and external cam surfaces 20a, 22a and 20b, 22b, i.e., a clockwise direction for the cam collar 18a and a counterclockwise direction for the cam collar 18b. In other words, the cam collars 18a and 18b are rotated in axially stationary opposite directions in the direction of the "lock" arrows in FIG. 2 to lock the device 10 in a selected location and are rotated in axially stationary opposite directions in the direction of the "release" arrows in FIG. 2 to unlock the device 10 for movement to another selected location.

As shown in FIGS. 2 through 4, the cam sleeve 12 includes axially extending slots 26a and 26b in each of the first and second portions 24a and 24b thereof, respectively. The axially extending slots 26a and 26b are each disposed between positions of maximum radii as at 22a' and 22b' and minimum radii as at 22a'' and 22b'' of the external cam surfaces 22a and 22b, respectively. Moreover, the axially extending slots 26a and 26b extend from opposing ends 28 and 30 of the cam sleeve 12 to an intermediate point 32 between the first and second portions 24a and 24b of the cam sleeve.

As will be appreciated by referring to FIG. 2, the axially extending slots 26a and 26b are circumferentially spaced at the intermediate point 32 to define a bridge portion 34 joining the first and second portions 24a and 24b of the cam sleeve 12. It will also be seen that the cam sleeve 12 includes a retaining flange 36 and 38 on the opposing ends 28 and 30, respectively, to retain the cam collars 18a and 18b in axially stationary positions on the cam sleeve 12 (see, also, FIG. 1). In order to allow a reduction in diameter of the cam sleeve 12 for assembly of the cam collars 18a and 18b thereon, the axially extending slots 26a and 26b extend completely through the retaining flanges 36 and 38, respectively.

In the embodiment illustrated in the drawings, the internal surface 16 of the cam sleeve 12 is generally cylindrical although it is entirely possible for the internal surface of the cam sleeve to be of any of a wide variety of other regular and irregular shapes so as to conform to any bar member cross section. In fact, the only criteria is for the internal surface of the cam sleeve to generally conform in shape to the external surface of the bar member and normally be dimensioned the same as or larger than the bar member so as to be slidably movable along the bar member.

Referring to FIGS. 1 and 2, the cam sleeve 12 is preferably of a length substantially the same as the combined length of the cam collars 18a and 18b. The retaining flanges 36 and 38 then maintain the cam collars 18a and 18b in abutting relation on the cam sleeve 12. In addition, the cam collars 18a and 18b each preferably include an external gripping surface defined by a plurality of lugs 18a' and 18b', respectively.

While not specifically mentioned in the above description, it will be appreciated by those skilled in the art that the first and second portions 24a and 24b of the cam sleeve 12 are joined only by the bridge member 34, i.e., the cam sleeve 12 is circumferentially slit as at 40 between the first and second portions 24a and 24b thereof substantially completely thereabout with the exception of the bridge portion 34. As a result, the cam collars 18a and 18b are able to reduce the dimension of the internal surface 16 of the cam sleeve 12 for selective radially uniform compressed frictional engagement with the bar member 14 by applying opposing axially stationary rotational movement to the cam collars 18a and 18b in the locking directions as indicated in FIG. 1.

Figure 5:
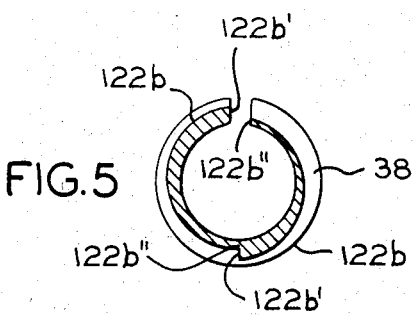
FIG. 5 is a cross sectional view illustrating an alternative embodiment to that shown in FIG. 4.

Referring to FIG. 5, an alternative cam configuration has been illustrated. This view, which is comparable in location to FIG. 4, illustrates an embodiment in which the cam sleeve is provided with a pair of external cam surfaces such as 122b each of which extends approximately one-half of the way around the circumference between positions of maximum and minimum radii 122b' would and 122b" and this, of course, apply to each of the first and second portions of the cam sleeve (although only one portion has been illustrated in the drawings) with the areas of increasing radii extending in circumferentially opposite directions for the first and second portions, as before. In like fashion, the cam collars will also have a corresponding number of internal cam surfaces adapted to cooperate with the external cam surfaces on the cam sleeve.

While not specifically shown, the embodiment illustrated in FIG. 5 will employ a pair of diametrically separated bridge portions interrupting the circumferential slits. This will give greater stability to the cam sleeve at times when it is not mounted on a bar member. In addition, while a pair of external cam surfaces has been illustrated, any number of external cam surfaces could be utilized.

Referring once again to the embodiment illustrated in FIGS. 1 through 4, a releasable locking device for cylindrical surfaces has been provided. It can be utilized for a multitude of purposes and is particularly advantageous for use as a locking collar to retain weights on a barbell. However, those skilled in the art will recognize that the device can be used in other applications such as telescoping tubular members.

With regard to telescoping tubular members as described in detail hereinabove, the first and second portions of the cam sleeve can have the same or different inner diameters. It will also be appreciated that the releasable locking device can be moved along the bar or tube and locked in any position with dual locking members to thereby provide a safety factor not found in locking collars presently on the market. In addition, because of the unique features of the invention, the releasable locking collar is economical to manufacture and assemble.

Various changes coming within the spirit of the present invention may suggest themselves to those skilled in the art. Hence, it will be understood that the invention is not to be limited to the specific embodiments shown and described or the uses mentioned. On the contrary, the specific embodiments and uses are intended to be merely exemplary with the present invention being limited only by the true spirit and scope of the appended claims.

I claim:

1. A releasable locking device for frictionally engaging a bar member, comprising:

a cam sleeve adapted to be adjustably positioned in selectable locations along said bar member, said cam sleeve haivng an internal surface generally conforming in shape to the external surface of said bar member entirely along the length of said cam sleeve and said internal surface of said cam sleeve normally being dimensioned the same as or larger than said bar member so as to be slidably movable along said bar member for adjustably positioning said cam sleeve in a selected location, said cam sleeve being formed of a resilient material for selective radially uniform compressed frictional engagement with said external surface of said bar member; and a pair of cam collars adpated to be operably disposed in substantially coaxial axially fixed and oppositely directed relation on said cam sleeve, said cam collars each having a continuous internal cam surface adapted to cooperate with a mating external cam surface on said cam sleeve to reduce the dimension of said internal surface of said cam sleeve for selective radially uniform compressed frictional engagement with said bar member in response to opposing axially stationary rotation of said cam collars relative to said cam sleeve in locking directions, said cam collars cooperaing with said cam sleeve to define a pair of interconnected individual locking members.

2. The releasable locking device as defined by claim 1 wherein said cam sleeve is formed with said external cam surfaces oppositely directed, said cam collars being substantially identical in construction, said cam collars being disposed on said cam sleeve with said internal cam surfaces oppositely directed.

3. The releasable locking device as defined by claim 2 wherein said cam sleeve includes a first portion of increasing radius in one circumferential direction defining one of said external cam surfaces and wherein said cam sleeve includes a second portion of increasing radius in the other circumferential direction defining the other of said external cam surfaces.

4. The releasable locking device as defined by claim 3 wherein said cam collars are arranged with said internal cam surfaces thereof having increasing radii in the same circumferential directions as the corresponding ones of said external cam surfaces of said cam sleeve.

5. The releasable locking device as defined by claim 4 wherein said locking directions are the circumferential directions of increasing radii of said internal and external cam surfaces.

6. The releasable locking device as defined by claim 5 wherein said cam collars are adapted to permit expansion of the dimension of said internal surface of said cam sleeve to release said cam sleeve from selective radially compressed frictional engagement with said bar member in response to opposing axially stationary rotation of said cam collars relative to said cam sleeve in releasing directions.

7. The releasable locking device as defined by claim 6 wherein said releasing directions are directly opposite the circumferential directions of increasing radii of said internal and external cam surfaces.

8. The releasable locking device as defined by claim 3 including an axially extending slot in each of said first and second portions of said cam sleeve, said axially extending slots each being disposed between positions of maximum and minimum radii of said external cam surfaces, said axially extending slots extending from opposing ends of said cam sleeve to an intermediate point between said first and second portions thereof.

9. The releasable locking device as defined by claim 8 wherein said cam sleeve is circumferentially slit substantially completely thereabout at said intermediate point between said first and second portions thereof.

10. The releasable locking device as defined by claim 9 wherein said axially extending slots are circumferentially spaced at said intermediate point to define a bridge portion joining said first and second portions of said cam sleeve.

11. The releasable locking device as defined by claim 10 including a retaining flange on each of the opposing ends of said cam sleeve, said axially extending slots extending through said retaining flanges, said retaining flanges being adapted to retain said cam collars in axially stationary positions on said cam sleeve.

12. The releasable locking device as defined by claim 11 wherein said internal surface of said cam sleeve is generally cylindrical, said cam sleeve being of a length substantially the same as the combined length of said cam collars, said retaining flanges maintaining said cam collars in abutting relation on said cam sleeve.

13. The releasable locking device as defined by claim 12 wherein said cam collars each include an external gripping surface defined by a plurality of lugs.

* * * * *